United States Patent [19]

Shiga et al.

[11] Patent Number: 5,127,256
[45] Date of Patent: Jul. 7, 1992

[54] APPARATUS FOR ADJUSTING A SLIDE STROKE OF A PRESS MACHINE

[75] Inventors: Masakatsu Shiga, Machida; Naonori Taniguchi; Takeshi Yoshida, both of Sagamihara, all of Japan

[73] Assignee: Aida Engineering, Ltd., Sagamihara, Japan

[21] Appl. No.: 665,569

[22] Filed: Mar. 5, 1991

[30] Foreign Application Priority Data

| Mar. 5, 1990 [JP] | Japan | 2-54744 |
| May 1, 1990 [JP] | Japan | 2-115390 |
| May 16, 1990 [JP] | Japan | 2-127908 |

[51] Int. Cl.⁵ ............................................. B21J 9/18
[52] U.S. Cl. ........................................ 72/441; 72/450; 72/452; 100/257
[58] Field of Search ............... 72/441, 446, 449, 450, 72/452; 100/257

[56] References Cited

U.S. PATENT DOCUMENTS

| 4,156,387 | 5/1979 | Portmann | 100/257 |
| 4,785,732 | 11/1988 | Czapka et al. | 100/257 |
| 4,846,014 | 7/1984 | Shiga et al. | 100/257 |

FOREIGN PATENT DOCUMENTS

| 2854182 | 6/1979 | Fed. Rep. of Germany | 100/257 |
| 3034009 | 3/1982 | Fed. Rep. of Germany | 100/257 |
| 232231 | 1/1986 | Fed. Rep. of Germany | 100/257 |
| 2479740 | 10/1981 | France | 100/257 |
| 55-66725 | 10/1953 | Japan |  |
| 54-42305 | 12/1979 | Japan |  |
| 55-13039 | 3/1980 | Japan |  |
| 92200 | 5/1984 | Japan | 100/257 |

*Primary Examiner*—David Jones
*Attorney, Agent, or Firm*—Morrison Law Firm

[57] ABSTRACT

A press machine slide stroke adjusting apparatus comprises an eccentric sleeve connected to a slide and fitted over a circular eccentric portion of a crank shaft, first teeth provided on the eccentric sleeve and concentric to the circular eccentric portion, a main gear disposed on the crank shaft in coaxial relationship therewith, and second teeth meshing with the first teeth and provided on main gear coaxially with the crank shaft. The crank shaft is disconnected and connected from and to the main gear by coupling. A hydraulic actuator disengages the crank shaft from the main gear. The rotation of the crank shaft disconnected from the main gear is prevented by engagement of a pin and an engaging hole in an engaging block. Under such conditions, the eccentric sleeve is turned relative to the circular eccentric portion to adjust a vertical stroke of the slide.

13 Claims, 19 Drawing Sheets

FIG. 17
FIG. 18
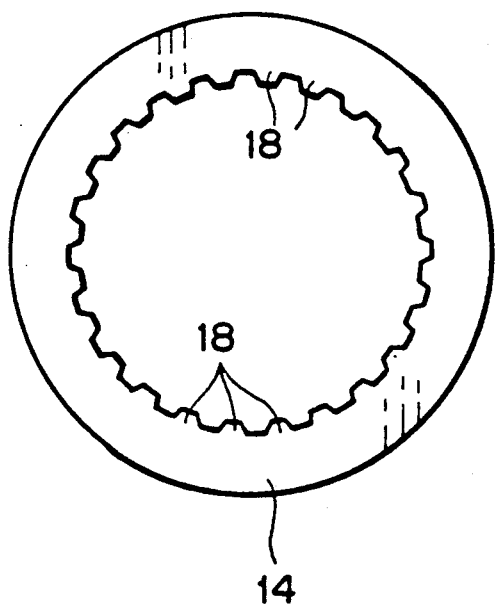
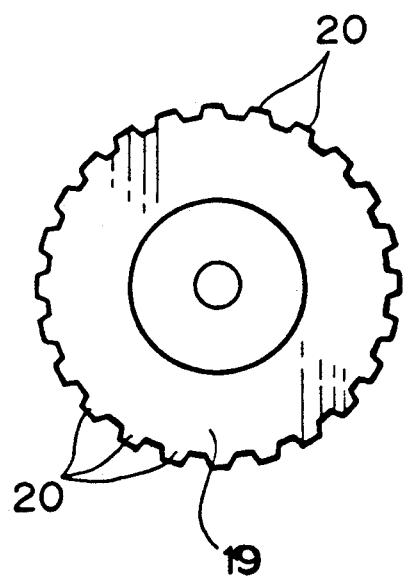

APPARATUS FOR ADJUSTING A SLIDE STROKE OF A PRESS MACHINE

BACKGROUND OF THE INVENTION

1. Field of the Invention

The present invention relates to an apparatus for adjusting a vertical stroke of a slide of a press machine.

2. Description of the Related Art

Apparatus exists which is capable of changing a vertical stroke of a slide in order to improve the productive efficiency to comply with the size and kinds of goods produced by the press machine or to provide general usability in a single press machine (Examined Published Japanese Utility Model Applications Sho 54-42305 and 55-13039, and Japanese Patent Application Hei 1-30696). In these devices, an eccentric sleeve is coupled to an eccentric portion of a crankshaft which moves the slide vertically. A connecting rod fits over the eccentric sleeve at its upper end and connects with the slide at its lower end. By turning the eccentric sleeve around the eccentric portion of the crankshaft, the angular phase between the eccentric portion of the crankshaft and the eccentric sleeve can be changed to adjust the vertical stroke of the slide when the crankshaft is rotated.

In both the Examined Published Utility Model Applications Sho 54-42305 or 55-13039, the rotation of the eccentric sleeve around the eccentric portion of the crankshaft is performed by manually turning the eccentric sleeve using a tool or by turning a bolt. In Patent Application Hei 1-30696, the eccentric sleeve is fitted axially slidably over the eccentric portion of the crankshaft. If the eccentric sleeve is slid axially, teeth are engaged and disengaged so that the eccentric sleeve is selectively coupled to and separated from the eccentric portion of the crankshaft or the connecting rod. If the eccentric sleeve is separated from the eccentric portion of the crankshaft and the crankshaft is then turned, the angular phase between the eccentric sleeve and the eccentric portion of the crankshaft is changed.

The operator is required to make a manual adjustment using a tool or the like when the vertical stroke of the slide is to be changed as in Examined Published Utility Model Applications 54-42305 and 55-13039, which suggests it takes much time and labor, so that these conventional arrangements are inefficient and cannot be automated.

In the Application Hei 1-30696, it should be ensured that the teeth of the the eccentric sleeve, eccentric portion of crankshaft and the connecting rod engage and disengage from each other each time the eccentric sleeve slides axially. In order to do so, the teeth engage smoothly when the angular phase between the eccentric sleeve and the eccentric portion of the crankshaft is changed. In order to ensure smooth engagement of the respective teeth, engagement must be adjusted to result in a predetermined positional relationship between the respective teeth. In the Patent Application Hei 1-30696, the crankshaft is supported by two bearings between which the eccentric sleeve, the eccentric portion and the connecting rod are disposed and those teeth are disposed between the bearings, so that adjustment of the teeth's engagement is difficult.

While a slide stroke of a single crankshaft is adjusted in the respective conventional devices, there are other press machines which include two parallel crankshafts and a plurality of connecting rods, and, more particularly, a press machine which includes connecting rods, one for each crankshaft (2-point press machine), and a press machine which includes connecting rods, two for each crankshaft (4-point press machine). In those presses, each slide stroke for the respective connecting rods is required to be changed by the same amount at the same time, The above conventional apparatus does not do this

OBJECTS OF THE INVENTION

It is an object of the present invention to provide an apparatus for adjusting the vertical stroke of a slide simply, in a short time, that is capable of automating work.

It is another object of the present invention to provide a slide stroke adjusting apparatus which is capable of easily adjusting the engagement of respective teeth when the apparatus has a coupling structure in which the teeth are engaged with and disengaged from each other by moving them along the axis of the components.

It is a further object of the present invention to provide a press slide stroke adjusting apparatus which is capable of changing the respective slide strokes of the connecting rods simultaneously by the same quantity in the 2- and 4-point presses in which two parallel crankshafts are provided.

SUMMARY OF THE INVENTION

The present invention is an apparatus for adjusting the slide stroke of a press, comprising an eccentric sleeve fitted over a circular eccentric portion provided on a crank shaft in eccentric relationship thereto; and a connecting rod having an upper end fitted over the eccentric sleeve and having a lower end connected to a slide, wherein the rotation of the eccentric sleeve relative to the circular eccentric portion changes the angular phase between the circular eccentric portion and eccentric sleeve to adjust a vertical stroke of the slide by rotation of the crank shaft. The apparatus includes first teeth provided on the eccentric sleeve in concentric relationship thereto; a main gear disposed coaxial to and on the crank shaft and driven by a drive shaft to which the drive forces of a main motor and a speed decreasing motor are transmitted; second teeth provided on the main gear coaxially with the crank shaft and meshing with the first teeth; a device including a hydraulic actuator for moving the crank shaft axially; a coupling provided between the crank shaft and the main gear for disconnecting and connecting the crank shaft and main gear in accordance with the axial movement of the crank shaft; and a device including a pin and a hole for preventing the rotation of the crank shaft which has moved axially to thereby disconnect the coupling.

Two crank shafts are parallel. The main gears disposed on the corresponding crank shafts mesh with each other, and one of the main gears driven by the drive force of the single drive shaft transmits a torque to the other of the main gears.

The coupling includes a coupling gear with internal or external teeth on the crank shaft and a coupling gear with internal or external teeth provided on the main gear. The crank shaft may be supported rotatably and axially movable by bearings disposed one on each side of the circular eccentric portion, and the coupling gears may be provided on the crank shaft extending beyond one of the bearings and on the respective ends of the main gear.

An axial end of a tooth of the coupling gear has a chamfered portion formed thereon by causing the rotating tapering tool and the tooth groove of the coupling gear to approach each other radially of the coupling gear when a tilted angle for moving a larger base end of the rotating tapering tool and the center of the coupling gear away from each other is provided between the axis of the tapering tool and the axis of the gear, and the side of the taper of the rotating tool opposes the groove in the coupling gear radially of the coupling gear. The chamfered portion may be formed by causing the tool and the tooth groove of the coupling gear to approach radially of the coupling gear and causing the tool and the coupling gear to approach such that the taper of the rotating tool is inserted into the coupling groove along the axis of the tool or by causing the rotating tool and the tooth groove of the coupling gear to approach in the radial direction of the coupling gear while moving the taper of the tool away from the tooth groove along the axis of the tool. When the axis of the tool is parallel to the axis of the coupling gear and the side of the taper and the tooth groove of the coupling gear face each other radially of the coupling gear.

By appropriately setting the tilt angle provided between the axis of the rotating tool and the axis of the gear in accordance with tooth pitch, etc., when the gear is chamfered in such way, an end surface of the tooth is chamfered while producing a chamfering line along the center passing line passing through the center of the gear for both the internal- and external-tooth gears. By providing such a chamfer operation on the respective teeth, an angle edge line coincident with the center passing line is formed on an end surface of each tooth, so that the internal- and external-tooth gears are smoothly engaged with each other when one of the gears moves axially.

When a pressing operation is to be performed, the coupling is coupled and the drive shaft is rotated by the main motor to thereby rotate the main gear. Thus, the main gear, crankshaft and eccentric sleeve are rotated as a unit and the slide moves vertically in a stroke which is twice as long as the distance between the center of the crankshaft and the center of the eccentric sleeve.

When the slide stroke is to be changed, the crank shaft is moved axially to disengage the coupling or the crank shaft is prevented from rotating by the crank shaft rotation preventing device, and the main gear is then rotated at a decreased speed by the rotation of the drive shaft resulting from the operation of a speed reducing motor. Thus, the eccentric sleeve is rotated around the circular eccentric portion through the first and second teeth, and hence the distance between the center of the crank shaft and the center of the eccentric sleeve is changed. Therefore, the coupling is coupled by axial return of the crank shaft, and the drive shaft is rotated by the main motor. If the main gear is then rotated, the slide is moved vertically in a new stroke.

BRIEF DESCRIPTION OF THE DRAWINGS

FIGS. 12-16 show the chamfering of a coupling gear with external teeth in which:

FIG. 12 corresponds to FIG. 7;
FIG. 13 corresponds to FIG. 8;
FIG. 14 corresponds to FIG. 9;
FIG. 15 corresponds to FIG. 10; and
FIG. 16 corresponds to FIG. 11.

FIG. 17 is a schematic front view of a coupling gear with internal teeth.

FIG. 18 is a schematic front view of a coupling gear with external teeth.

FIGS. 20-26 illustrates another embodiment of a process for chamfering a coupling gear, in which:

FIG. 20 is a front view of a machine tool for carrying out the embodiment;
FIG. 21 corresponds to FIG. 7;
FIG. 22 corresponds to FIG. 8;
FIG. 23 corresponds to FIG. 9;
FIG. 24 corresponds to FIG. 12;
FIG. 25 corresponds to FIG. 13; and
FIG. 26 corresponds to FIG. 14.

DETAILED DESCRIPTION OF THE PREFERRED EMBODIMENT(S)

One embodiment of the present invention will be described with reference to the accompanying drawings.

Figure 1:
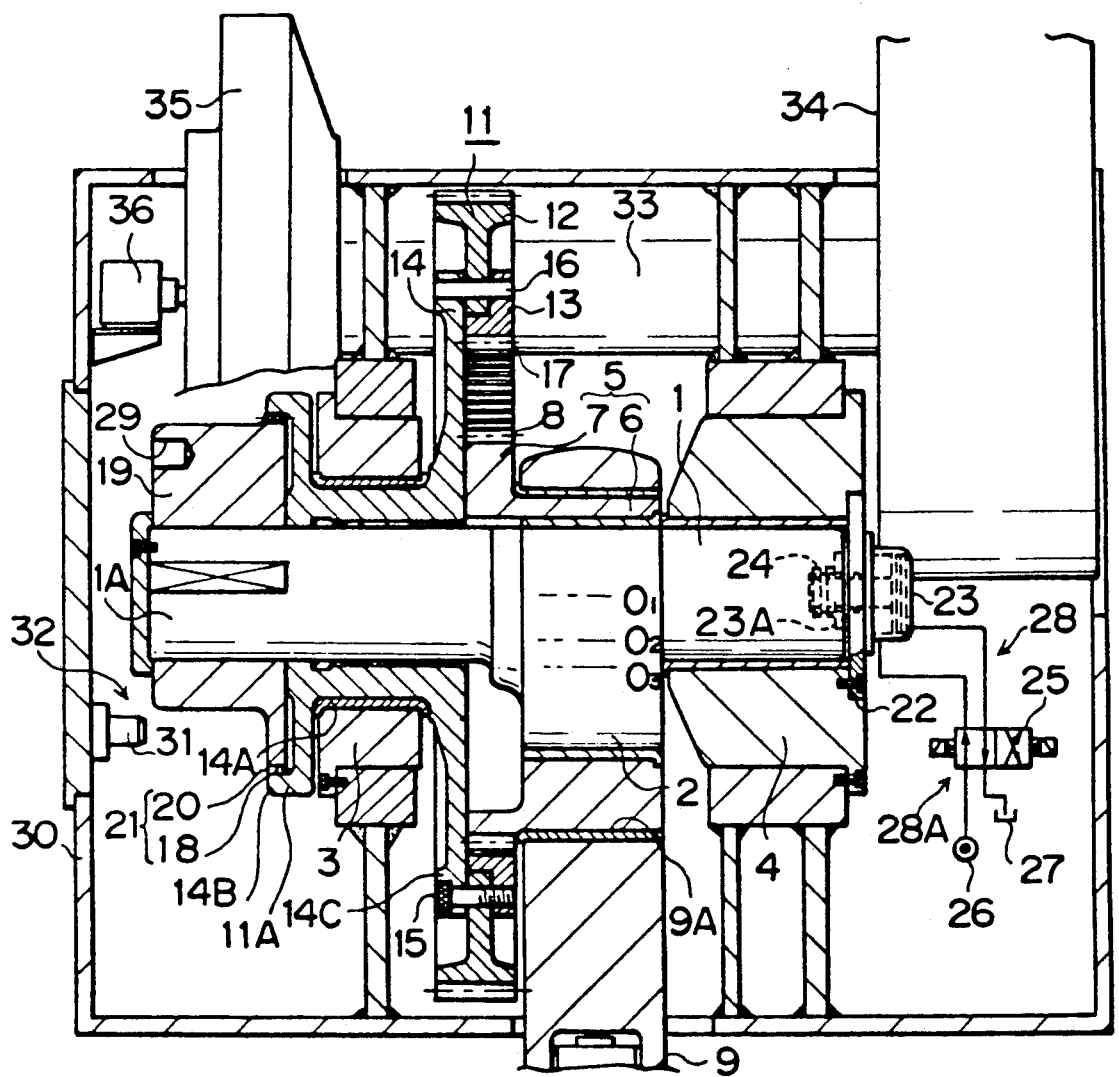
FIG. 1 is a vertical cross-sectional view of a crank shaft and its vicinity indicative of an apparatus according to one embodiment of the present invention.
Figure 2:
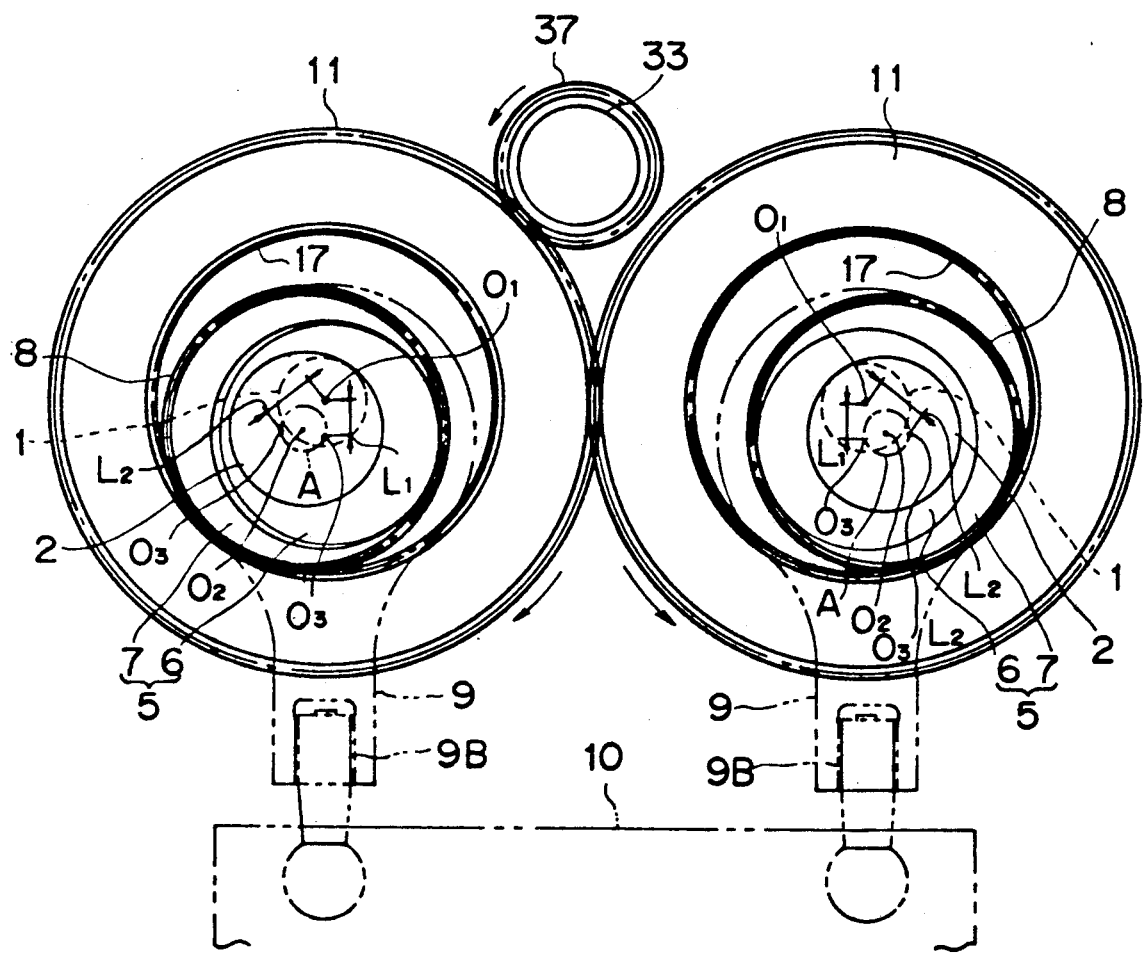
FIG. 2 is a view of two parallel crank shafts as viewed from their ends and illustrating the principles of adjusting the slide stroke.

FIG. 1 is a cross-sectional view of a crank shaft 1 and its vicinity disposed in a crown of a press machine. The horizontal crank shaft 1 is supported rotatably and axially movably by bearing 3 and 4 disposed at the both ends of eccentric portion 2 thereof. As shown in FIG. 2, the eccentric portion 2 takes a circular shape. As shown in FIG. 1, eccentric portion 2 is rotatably fitted into eccentric sleeve 5 which includes circular portion 6 fitted over eccentric portion 2 and flange 7 provided at an end of circular portion 6. The flange 7 has first teeth 8 as external teeth on its outer surface.

In FIGS. 1 and 2, the center of crank shaft 1 is $O_1$ and the center of circular eccentric portion 2 is $O_2$. The center of eccentric sleeve 5 or circular portion 6 is $O_3$. Therefore, the eccentric sleeve 5 is fitted eccentric to eccentric portion 2. The first teeth 8 of the eccentric sleeve 5 an made concentric to the eccentric portion 2. The circular portion 6 of the eccentric sleeve 5 is fitted in an opening 9A provided at an upper portion of a connecting rod 9, a lower end of which is connected with a slide 10 shown in FIG. 2. Thus, the slide 10 is connected to the eccentric portion 2 of the crank shaft 1 through the eccentric sleeve 5 and the connecting rod 9.

In FIG. 1, a main gear 11 is disposed concentric to the crank shaft 1. The main gear 11 is made up of an external toothed gear 12, an internal toothed gear 13, and a rotating member 14 held by a bolt (not shown) and a pin 16. A set of internal teeth of internal toothed gear 13 is a second set of teeth 17 concentric to the crank shaft 1. A flange 7 of eccentric sleeve 5 is inserted into the internal toothed gear 13 and the first and second teeth 8 and 17 are engaged partially as shown in FIG. 2.

The rotating member 14 of main gear 11 has an annular axial groove 14A receiving a bearing 3 at substantially its center. The groove 14A has flange portions 14B, 14C at its corresponding ends, so that main gear 11 has an end 11A comprising flange portion 14B extending beyond the bearing 3. The crank shaft 1 also has an end 1A beyond the bearing 3 so as to pass through the rotating member 14.

The rotating member 14 of main gear 11 has internal teeth 18 on its inner periphery. The crank shaft 1 has a coupling member 19 fixed to the end 1A. The coupling member 19 has on its outer periphery external teeth 20 which are the same in number as the internal teeth 18. The rotating member 14 is a coupling gear with the teeth 18 provided internally while the coupling member 19 is a coupling gear with the teeth 20 externally. These gears meshed with each other constitute a coupling 21 which engages and disengages the crank shaft 1 and main gear 11 to and from each other.

A hydraulic actuator 23 is attached to the bearing 4 through an attaching plate 22. A piston rod 23A of hydraulic actuator 23 is connected rotatably at its one end to the crank shaft 1 through a bearing 24. The hydraulic actuator 23 is joined with an oil source 26 and an oil tank 27 through a changeover valve 25. The piston rod 23A is reciprocated by a changeover of the valve 25, so that the crank shaft 1 is reciprocated axially while being supported by the bearings 3, 4. The valve 25, source 26 and oil tank 27 constitute a hydraulic circuit 28A. The hydraulic circuit 28A and hydraulic actuator 23 constitute a crank shaft moving device 28 to move the crank shaft 1 axially. When the crank shaft 1 is moved left in FIG. 1, the coupling 21 is separated.

The coupling member 19 also acts as an engaging block which has an engaging opening 29. An engaging pin 31 sticks out beyond the frame 30 toward the corresponding coupling member 19. If the crank shaft 1 is turned angularly at such a predetermined angle that the engaging pin 31 aligns axially with the engaging opening 29, the crank shaft moving device 28 moves the crank shaft 1 leftward in FIG. 1, the engaging pin 31 is inserted into the opening 29, so that the crank shaft 1 is prevented from rotating. Therefore, the engaging opening 29 and engaging pin 31 constitute a crank shaft rotation preventing device 32 to prevent the rotation of crank shaft 1.

As shown in FIG. 1, a drive shaft 33 is provided parallel to the crank shaft 1. A flywheel 34 is connected to one end of the drive shaft 33 through a main clutch while a brake 35 is provided at the other end of the drive shaft 33. The flywheel 34 is connected to the main motor (not shown) through a belt. A speed decreasing motor 36 is connected through a clutch to the end of drive shaft 33 where the brake 35 is provided. When (1) the main clutch is turned on, (2) the brake 35 is turned off, (3) the speed decreasing motor clutch is turned off and (4) the main motor is then driven, the drive shaft 33 is rotated through the flywheel 34 and the main clutch. If (1) the main clutch and brake 35 are turned off, (2) the speed decreasing motor clutch is turned on and (3) the speed decreasing motor 36 then is driven, the drive force of motor 36 is transmitted to drive shaft 33 to thereby cause same to rotate at a decreased speed. As shown in FIG. 2, a drive gear 37 fixed to the drive shaft 33 is engaged with the main gear 11, so that when the drive shaft 33 is rotated, the rotation is transmitted to the main gear 11.

The main motor and the speed decreasing motor 36 cooperate with each other to move the slide 10 vertically. However the main motor is fundamentally provided to move the slide 10 vertically for press working, while the speed decreasing motor 36 is provided to move the slide 10 vertically at reduced speed to adjust a replaced mold.

As shown in FIG. 2, two crank shafts 1 are provided, each of the crank shafts 1 having the corresponding eccentric sleeve 5, the main gear 11, etc., shown in FIG. 1, such that the respective vicinities of crank shafts 1 have the same structure. The main gear 11 disposed on the respective crank shafts 1 are engaged with each other. When one main gear 11 is rotated by the drive shaft 33, the other main gear 11 is also rotated. The circular eccentric portion 2 and eccentric sleeve 5 provided for each of the crank shafts 1 are set in FIG. 2 such that they have lateral symmetry.

The press machine according to the present embodiment is a 2-point press machine which has two parallel crank shafts 1, one with each connecting rod 9.

In operation, when press working is to be done, the coupling 21 is coupled as shown in FIG. 1, the main clutch is turned on, the brake 35 is turned off, the speed decreasing motor clutch is turned off and the main motor is driven. This causes the drive shaft 33, as well as main gears 11 to rotate such that the two main gears 11 rotate in opposite directions. This causes the crank shaft 1 connected to the main gear 11 to rotate through the coupling 21, and then causes the eccentric sleeve 5 connected to the main gear 11 to rotate through the first and second teeth 8 and 17. In this case, the members 11, 1 and 5 are rotated as a unit. As a result, the slide 10 moves vertically at a stroke of twice the distance L1 between the center 01 of crank shaft 1 and the center 03 of eccentric sleeve 5 through the connecting rod 9 having an upper end fitted into the circular portion 6 of eccentric sleeve 5.

Figure 4:
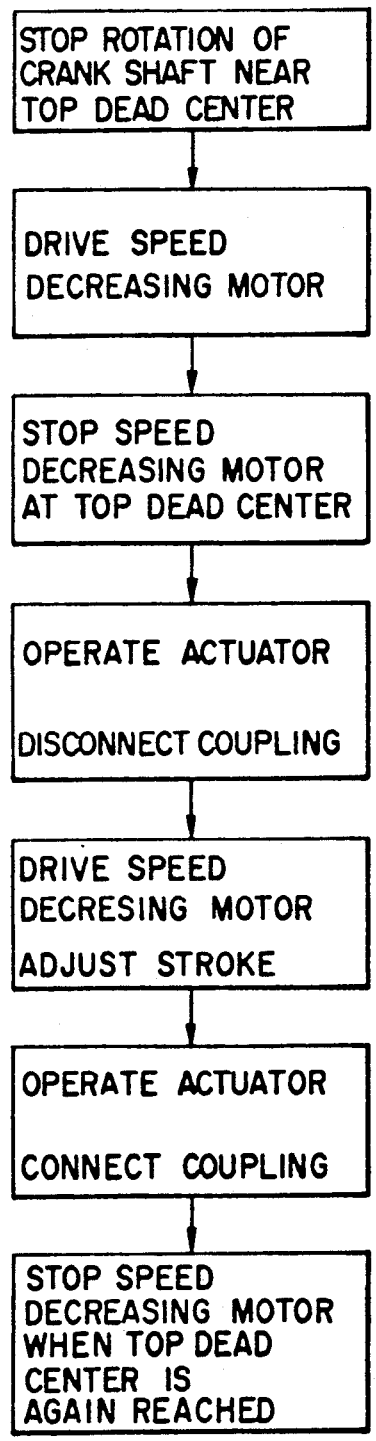
FIG. 4 is a flowchart indicative of adjustment of the slide.

If the slide stroke is to be changed after press working, the respective works are sequentially performed as shown in the flowchart of FIG. 4.

Figure 3:
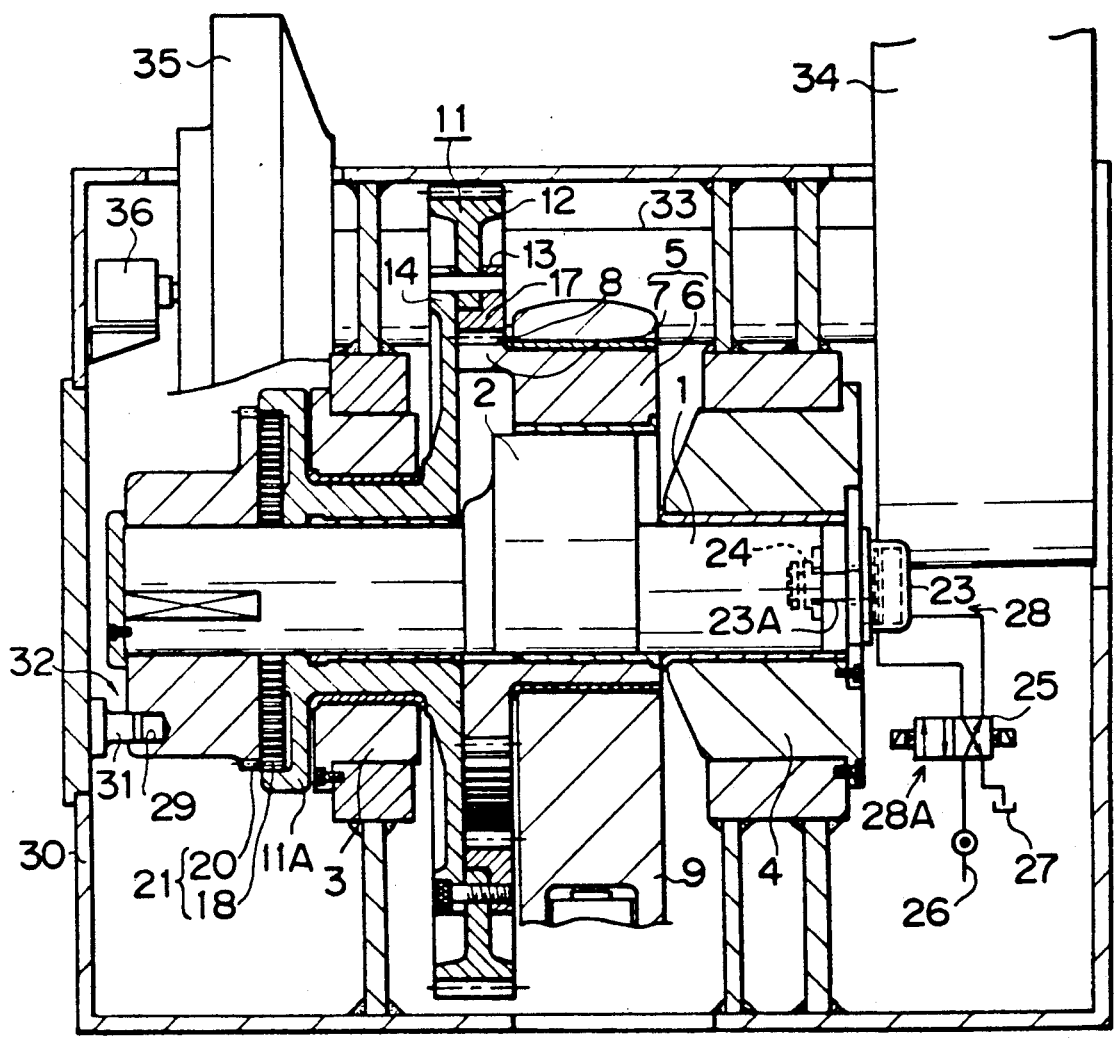
FIG. 3 is a view similar to FIG. 1 and showing the crank shaft which has moved axially.

First, crank shaft 1 is stopped by brake 35 at an angular position where hole 29 substantially axially aligns with and faces pin 31, namely, at a position close to the top dead center in the present embodiment. Next, the main clutch and brake 35 are turned off, and the speed decreasing motor switch clutch is turned on. By driving speed decreasing motor 36, drive shaft 33 rotates main gear 11, crank shaft 1, eccentric sleeve 5 as a unit as in the press working, and speed decreasing motor 36 is stopped at a position where hole 29 and pin 31 axially align exactly with each other. Thereafter, hydraulic actuator 23 of crank shaft moving device 28 moves crank shaft 1 leftward in FIG. 1 to thereby separate coupling 21 as shown in FIG. 3, to insert pin 31 into hole 29, such that crank shaft 1 is prevented from rotating by crank shaft rotation preventive device 32.

Speed decreasing motor 36 is again driven to thereby cause drive shaft 33 to rotate main gear 11 at a reduced speed. Since coupling 21 is disengaged at this time, the rotation of main gear 11 is transmitted not to crank shaft 1 but only to eccentric sleeve 5 through first and second teeth 8 and 17. Eccentric sleeve 5 rotates around circular eccentric portion 2 on crank shaft 1 over which eccentric sleeve 5 is fitted. At this time, crank shaft 1 is prevented from rotating by crank shaft rotation preventing device 32, so that it will not rotate.

When eccentric sleeve 5 is turned around circular eccentric portion 2, the center 03 of eccentric sleeve 5 shown in FIG. 2 moves along the circumference of circle A having the center coincident with the center 02 of circular eccentric portion 2. When center 03 arrives at a predetermined position, and in the present embodiment, the position of 0'3, namely, when the distance between the center 01 of crank shaft 1 and the center 03 of eccentric sleeve 5 is L2, crank shaft 1 is moved rightward in FIG. 3 by hydraulic actuator 23 of crank shaft moving device 28 to thereby move pin 31 out of hole 29 and to couple coupling 21.

Thus, main gear 11, crank shaft 1 and eccentric sleeve 5 are turned as a unit by the drive force of speed decreasing motor 36 which is driven continuously. When center 0'3 has arrived at a position just above center 01, or when it has returned to a new top dead center, it stops speed decreasing motor 36, so that adjustment of the slide stroke is completed.

When (1) the main clutch is turned on, (2) brake 35 is turned off, (3) the speed decreasing motor clutch is turned off, and (4) the main motor rotates drive shaft 33 to rotate main gear 11, crank shaft 1 and eccentric sleeve 5 as a unit, slide 10 is moved vertically in a stroke which is twice as long as distance L2 through connecting rod 9.

If the slide stroke is adjusted as mentioned above, the virtual length of connecting rod 9 changes, so that the length of connecting rod 9 may be corrected by screw 9B of FIG. 2, constituting the slide adjusting device, so as to obtain a predetermined die height. This operation is performed during adjustment of the slide stroke by speed decreasing motor 36.

According to the present embodiment as mentioned so far, adjustment of the slide stroke is performed by the axial movement of crank shaft 1 by crank shaft moving device 28 and the rotation of main gear 11 by speed decreasing motor 36 simply in a short time. Thus, the efficiency of adjustment of the slide stroke is improved. If crank shaft moving device 28 and speed decreasing motor 36 are automatically controlled by a controller, complete automation of the operation is achieved.

Adjustment of the slide stroke is performed using speed decreasing motor 36 as a drive source. Speed decreasing motor 36 moves slide 10 vertically at a reduced speed for adjustment of a mold when replaced, as mentioned above, and is originally provided in the press machine, so that adjustment of the slide stroke can be performed without providing a special-purpose drive source.

Coupling 21 is not disposed between two bearings 3 and 4 which support crank shaft 1, but between end 11A of main gear 11 protruding beyond one bearing 3 and end 1A of crank shaft 1. Thus adjustment of engagement of coupling 21, to normally connect and disconnect internal teeth 18 and external teeth 20 of coupling 21 by axial movement of crank shaft 1, and more specifically, adjustment of a position in the rotational direction where coupling member 19 with external teeth 20 is attached relative to crank shaft 1, and the chamfering of internal teeth 18 and external teeth 20 are facilitated whatever the positional relationship of crank shaft 1 and main gear 11 in the direction of rotation.

Since the respective main gears 11 of two parallel crank shafts 1 mesh with each other, the rotation of one main gear 11 by the drive force from the corresponding drive shaft 33 causes the other main gear 11 to rotate simultaneously such that respective adjustments of the slide strokes for connecting rods 9 provided at the corresponding crank shafts 1 can be made simultaneously by the same amount in the same manner.

Figure 5:
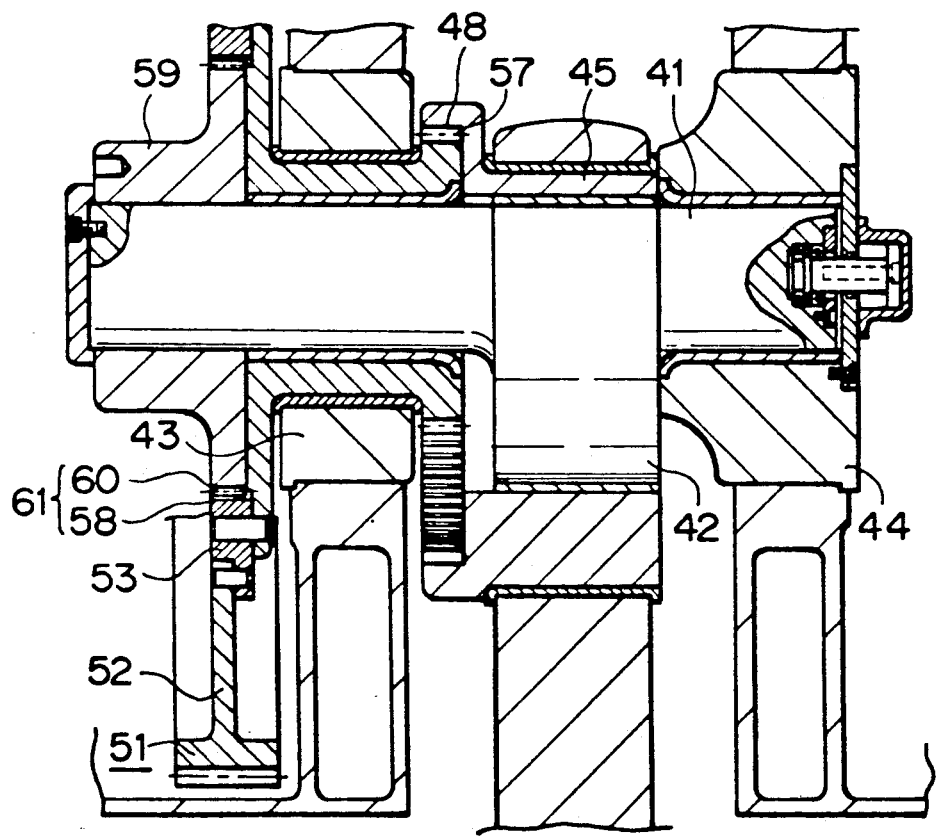
FIG. 5 is a view similar to FIG. 1 and illustrating an apparatus according to another embodiment.

FIG. 5 shows another embodiment of the present invention. In the present embodiment, first teeth 48 of eccentric sleeve 45 fitted on circular eccentric portion 42 of crank shaft 41 take the form of internal teeth while second teeth 57 of main gear 51 meshing with first teeth 48 take the form of external teeth. External and internal tooth gear members 52 and 53 constituting main gear 51 are disposed at a position where they protrude beyond bearing 43 of two bearings 43, 44 which support crank shaft 41. Internal tooth gear member 53 includes a coupling gear with internal gear 58. Crank shaft 41 has a fixed coupling member 59 which is a coupling gear with internal gear 60. These coupling gears constitute coupling 61.

While in the respective embodiments described above the coupling gears are illustrated as being composed of the internal teeth of the main gear and the external teeth of the crank shaft, these internal and external teeth can be interchanged. Alternatively, it may be composed of radially extending teeth meshing with each other and not of axially extending teeth.

The inventive apparatus is applicable to a 4-point press machine, i.e., a press machine having two crank shafts, one having a pair of connecting rods or a press machine having a single crank shaft with one or more connecting rods.

While crank shaft rotation preventive device 32 has been described as being composed of engaging hole 29 and pin 31, it may have the structure of a brake in which crank shaft 14 has frictionally braked flange out its end.

An embodiment of a process for chamfering the teeth of a coupling gear constituting coupling 21 will be described with reference to the drawings.

Figure 6:
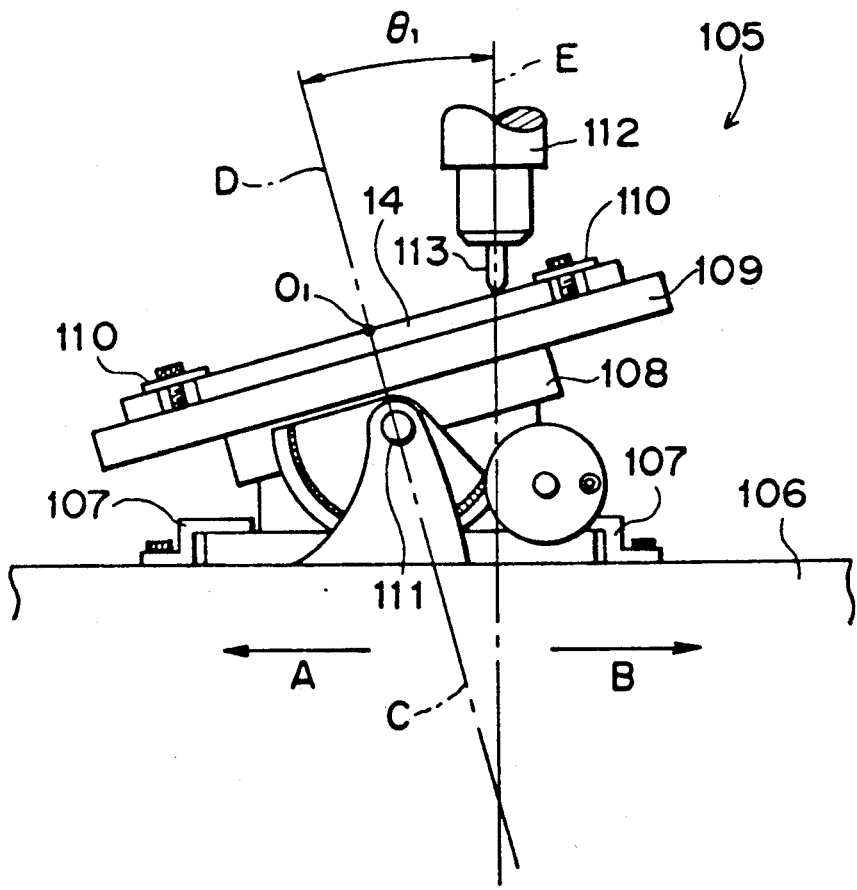
FIG. 6 is a front view of a machine tool used for carrying out one embodiment of a process for chamfering a coupling gear.

FIG. 6 shows a machine tool 105 which carries a tilting mechanism 107 on a table 106 which is movable horizontally as shown by the arrows A and B. Tilting mechanism 107 supports a work setting base 108 which has a work receiving plate 109 on which rotating member 14 comprising a coupling gear is set by clampers 110. In the present embodiment, the shape of the coupling gear is shown simplified.

Work receiving plate 109 is tiltable to any angle around horizontal shaft 111 and rotatable around axial line C through any rotational angle. Gear 14 is set on work receiving plate 109 such that the axis C of work receiving plate 109 and the axis D of gear 14 align.

Figure 7:
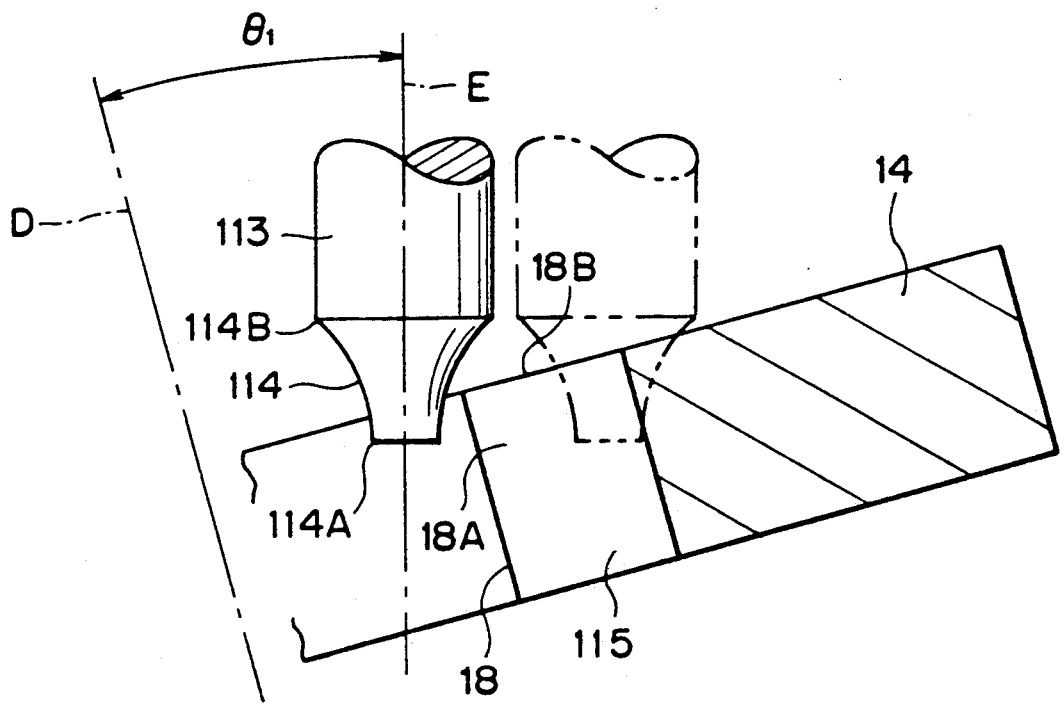
FIG. 7 shows the positional relationship between a coupling gear and a rotating tool when the internal teeth of the coupling gear are chamfered.

A rotating tool 113 is attached to a vertical spindle 112 of machine tool 105 and tapers at a tapered portion 114 where a cutting edge comprising a straight tooth or a helical tooth is provided, as shown in FIG. 7. In the present embodiment, tapered portion 114 has a configuration with opposing inwardly concave arcs. Namely, the taper diameter increases from a minimum diameter end 114A toward a maximum diameter base end 114B. Minimum diameter end 114A is smaller than the minimum width of tooth grooves 115, 116 of internal and external teeth 18 and 20 shown in FIGS. 10, 15, respectively, while the maximum diameter base end 114B is larger than the maximum width of tooth grooves 115, 116.

Rotating tool 113 attached to spindle 112 is inserted into a central opening in gear 14 with internal teeth 18, so that the side of tapered portion 114 of rotating tool 113 faces tooth groove 115 of gear 14 at an axial end of internal teeth 18 of gear 14 radially of gear 14, as shown in FIG. 7. As shown in FIG. 6, work receiving plate 109 of work setting base 108 is tilted left and downwardly around horizontal shaft 111, so that a tilt angle $\theta 1$ is provided between axis D of gear 14 and axis E of rotating tool 113 such that center O1 of gear 14 is moved away from taper base end portion 114B. Under such a condition, rotating tool 113 is rotated while table 106 of machine tool 105 is being moved horizontally in the direction of A of FIG. 6 such that rotating tool 113 and tooth groove 115 of gear 14 approach gradually radially of gear 14 to thereby cause tapered portion 114 to be inserted into tooth groove 115. If table 106 continues to be moved in the direction of A after tapered portion 114 is inserted into tooth groove 115, sides 18A and end surfaces 18B of internal teeth 18 on both the sides of tooth groove 115 are chamfered by the side of tapered portion 114. The reference character F of FIG. 9 denotes a chamfering line produced this time on end surface 18B of internal teeth 18.

If such chamfering is made while work receiving plate 109 is maintained horizontal without tilt angle $\theta 1$ being provided, side surface 18A and end surface 18B of internal teeth 18 are chamfered at the same place at a given height from taper end 114A. Therefore, the chamfering line produced on internal tooth end surface 18B is as shown by G in FIG. 9.

Since in the present embodiment tilt angle $\theta 1$ is provided, a portion of tapered portion 114 which chamfers internal tooth side 18A and end surface 18B moves away from the tapered portion end 114A as taper 114 enters into tooth groove 115. When tapered portion 114 arrives at the tooth bottom of gear 14 to terminate chamfering, end surface 18B is chamfered in the vicinity of taper base end 114B. Therefore, chamfering line F produced on end surface 18B is opened outward more than chamfering line G.

Figure 9:
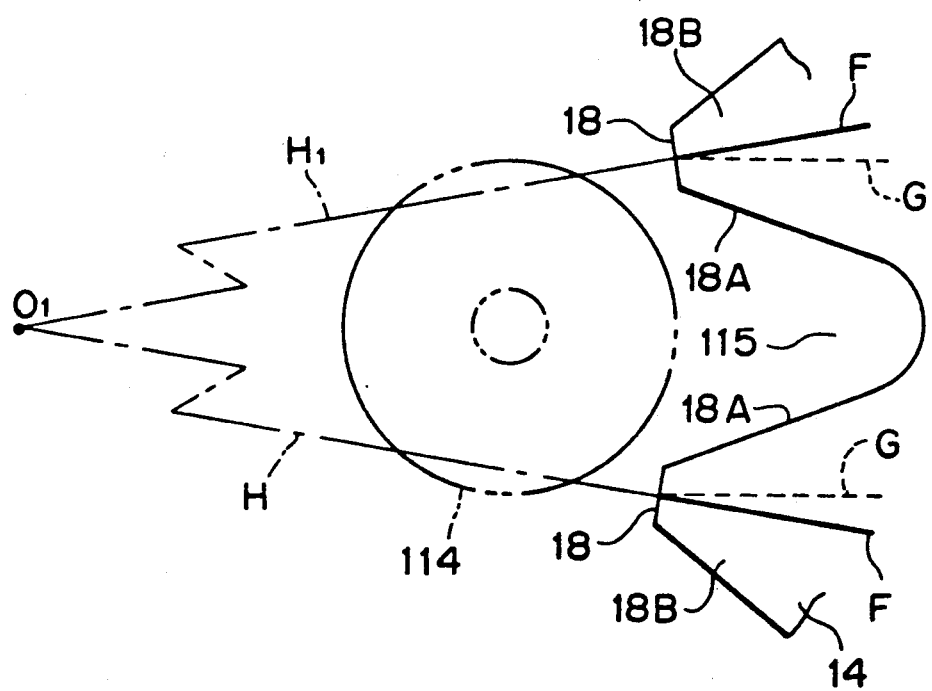
FIG. 9 is a plan view of a coupling gear indicative of the chamfering line formed on the coupling gear.

It will be seen from the above that if tilt angle $\theta 1$, the shape of tapered portion 114, the depth of tapered portion 114 inserted into gear 14 along axis E are set appropriately in accordance with the pitch of internal teeth 18, chamfering lines F can coincide with corresponding lines H1 passing through the center O1 of gear 14 while passing through the end centers of internal teeth 18, as shown in FIG. 9.

After the above operation, table 106 of machine tool 105 is moved in the B direction to remove tapered portion 114 from tooth groove 115. Thereafter, work receiving plate 109 is turned around axis C by a quantity of pitch of internal teeth 18 to thereby cause tapered portion 114 to face tooth groove 115 radially of gear 14 and the above operation is then repeated.

Figure 8:
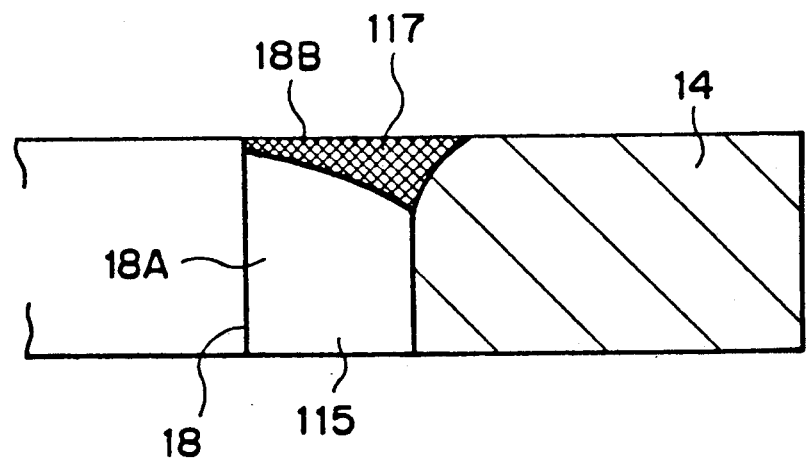
FIG. 8 is a cross sectional view of a coupling gear showing its chamfered surface.
Figure 10:
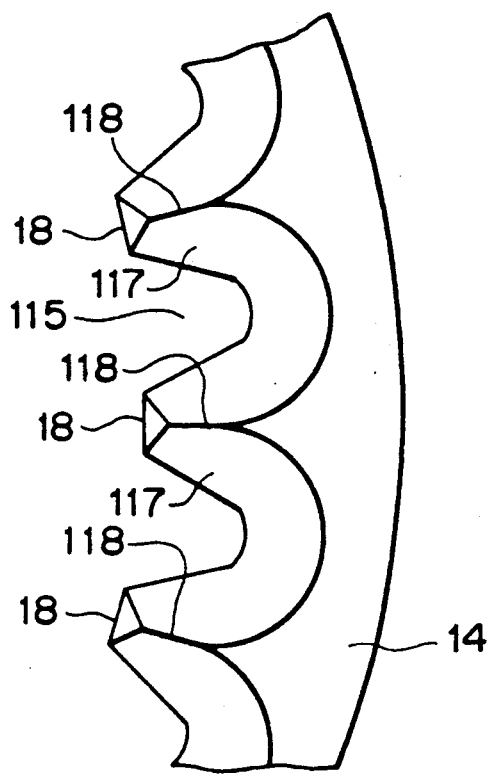
FIGS. 10 and 11 are a plan view and a perspective view, respectively, of a chamfered coupling gear.
Figure 11:
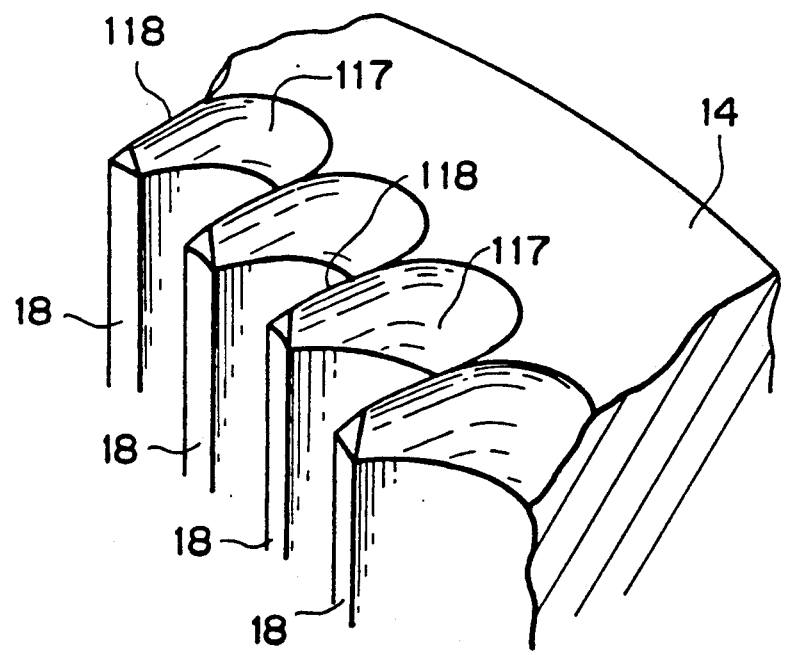

If respective internal teeth 18 are chamfered in the manner mentioned above, chamfered surfaces 117 are formed on sides 18A and end surfaces 18B of the respective internal teeth 18 as shown in FIG. 8. In addition, angle edge lines 118 of FIGS. 10 and 11 are formed on end surfaces 18B by chamfering lines F and coincide with center passing lines H1.

FIGS. 12-16 show chamfering external teeth 20 of coupling member 19 which is a coupling gear. Also, in this case, gear 19 is set on work receiving plate 109 and tilt angle $\theta 2$ is provided between axis E of rotating tool 113 and axis I of gear 19. In this tilt direction, the center O2 (FIG. 14) of gear 19 moves away from taper base end 114B.

Figure 12:
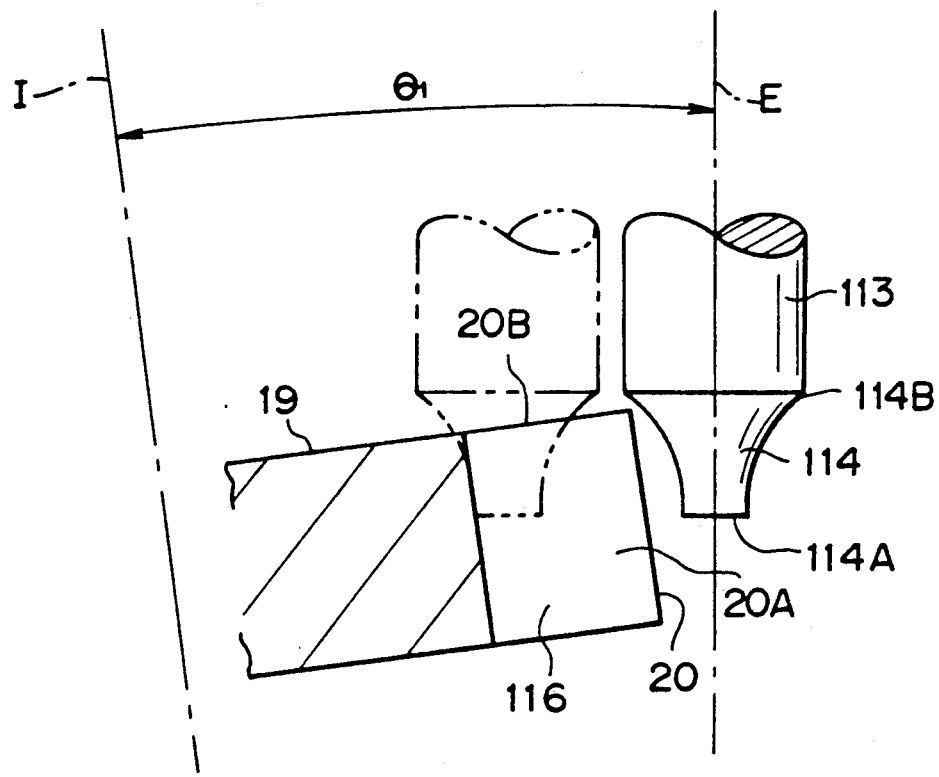
Figure 14:
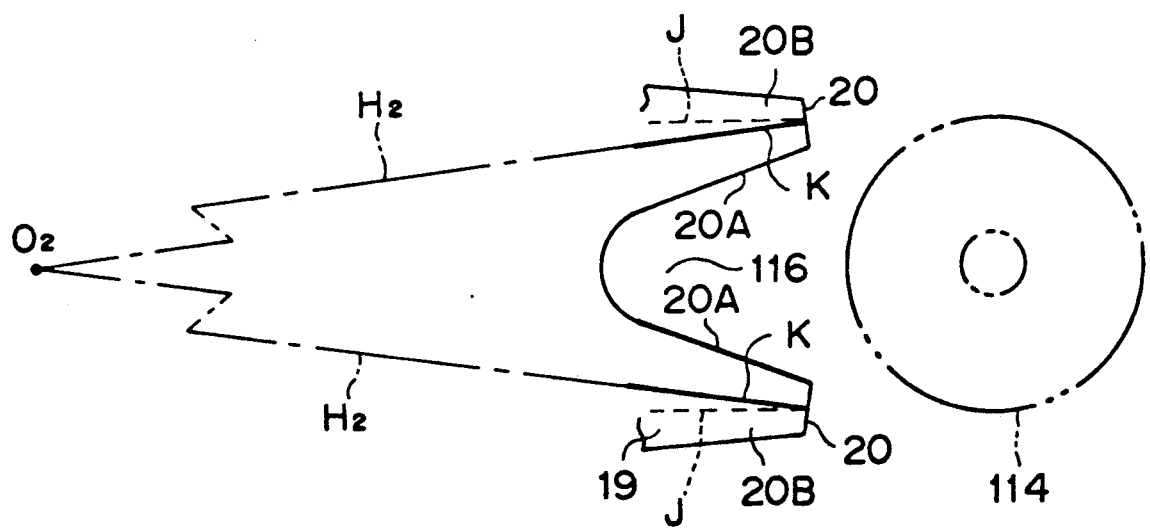

As shown in FIG. 12, the side of tapered portion 114 and tooth groove 116 in gear 19 face each other radially of gear 19, table 106 of machine tool 105 is moved horizontally in the B direction to thereby insert tapered portion 114 into tooth groove 116 to chamfer external teeth 20 on each side of tooth groove 116. The character J of FIG. 14 shows a chamfering line formed when no tilt angle $\theta 2$ is provided and K, a chamfering line formed when tilt angle $\theta 2$ is provided. As tapered portion is inserted into tooth groove 116, a portion of tapered portion 114 which chamfers side 20A and end surface 20B of external teeth 20 gradually moves away from base end portion 114B toward the minimum taper end 114A, so that chamfering line K is confined within chamfering line J to coincide with center line H2 passing through the center O2 of gear 19.

Figure 13:
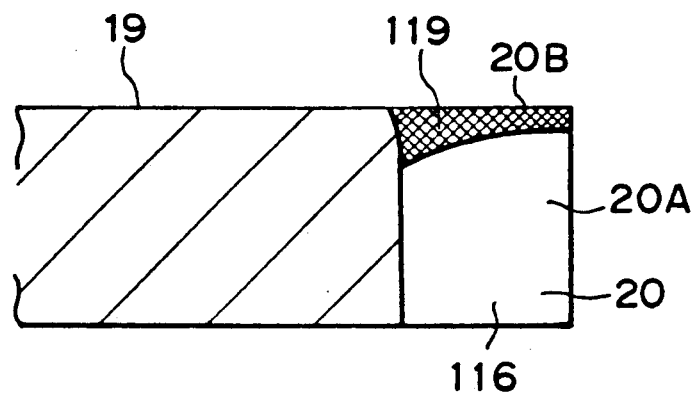
Figure 15:
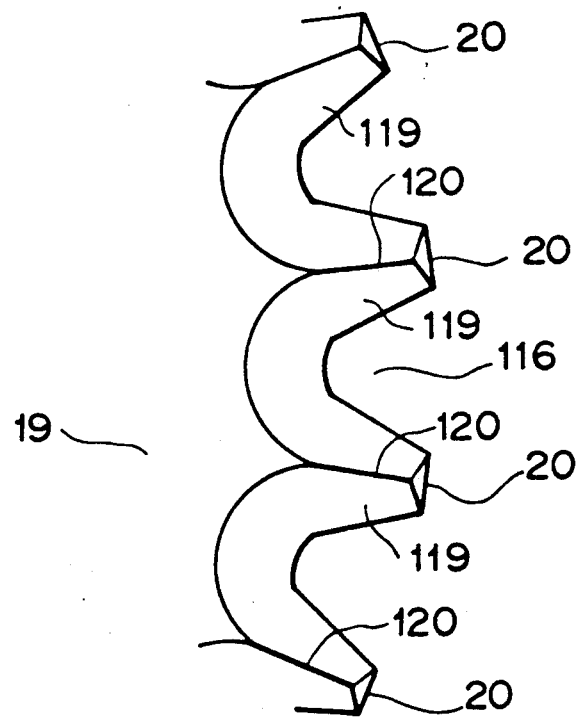
Figure 16:
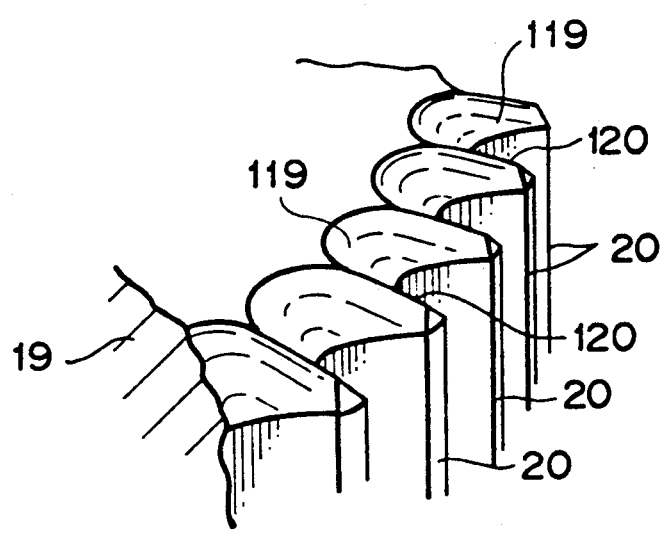

Therefore, by chamfering respective external teeth 20, chamfered surface 119 is formed on each of side 20A and end surface 20B of a respective external tooth 20, as shown in FIG. 13, and angle edge line 120 is formed by chamfering line K on end surface 20B as shown in FIGS. 15, 16.

Figure 19:
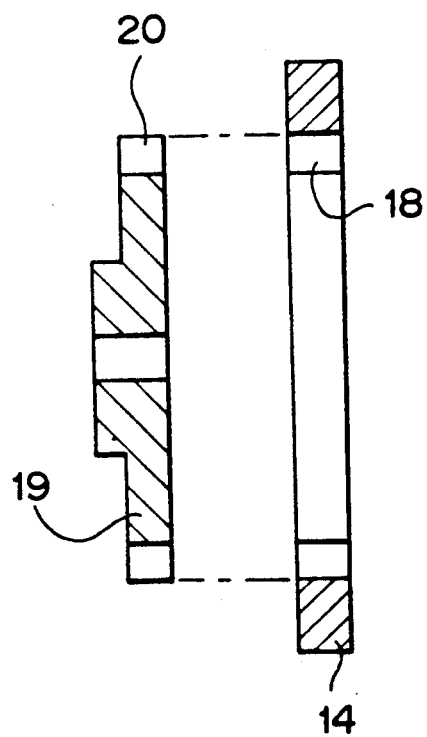
FIG. 19 shows meshing coupling gears, one with internal teeth and the other with external teeth.

As described above, angle lines 118, 120 which coincide with center lines H1, H2 passing through centers O1, O2 of coupling gears 14 and 19 with chamfered internal teeth 18 and external teeth 20, respectively, are formed on gears 14 and 20. Therefore, if one of gears 14, 19 is moved axially to cause the one gear to mesh with the other as shown in FIG. 19, no situation occurs in which internal and external teeth 18 and 20 do not mesh with each other due to mutual abutting of the end surfaces of internal teeth 18 and external teeth 20.

As described above, according to the present embodiment, the axis E of rotating tool 113 can be made substantially parallel to axes D, I of gears 14 and 19, so that external teeth 20 of gear 19 as well as internal teeth 18 of gear 14 can be chamfered.

As shown in Unexamined Published Japanese Utility Model Application Sho 55-66725, conventionally, a chamfering rotating tool is disposed relative to a gear such that the axis of the tool extends radially of the gear, an end of the tool is inserted into the tooth groove of the gear and the end surface of the teeth is then chamfered by rotating the tool. In this method, the axis of the tool must be put so as to extend radially of the gear and the end of the tool must be inserted into the gear groove in the gear outer-diameter direction, so that only the external tooth can be chamfered. In particular, internal teeth 18 of gear 14 in the coupling structure 21 cannot be chamfered using the conventional techniques.

Another embodiment of a process for chamfering a coupling gear will be described below.

In the previous and present embodiments, the same reference. Numerals are used to denote like elements and further description thereof will be omitted.

Figure 20:
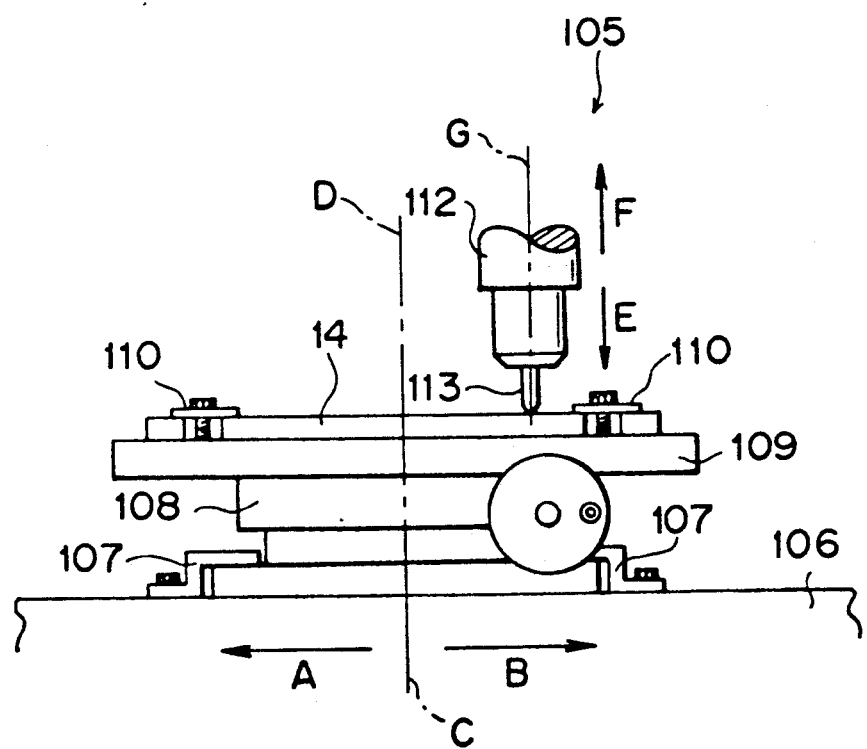

FIG. 20 shows machine tool 105 comprising an NC drilling machine carrying out the method of the embodiment. Vertical spindle 112 of machine tool 115 is movable in the vertical directions shown by E and F. In the present embodiment, tapered portion 114 takes the form of a truncated cone having opposing tilted straight line sides where the minimum and maximum diameter ends are shown by 114A and 114B, respectively.

As shown in FIG. 15, tapered portion 114 is inserted into the central opening in gear 14 such that the axis D of coupling gear 14 with internal teeth 18 and axis G of rotating tool 113 are parallel. Thus, as shown in FIG. 16, the tapered portion 114 side and the tooth groove 115 of gear 14 face each other radially of gear 14 at an end of gear internal teeth 18 perpendicular to the axis of the gear internal teeth 18. Under such a condition, machine tool table 106 is moved horizontally in the A direction and spindle 112 is moved in the E direction while rotating tool 113 with spindle 112 in FIG. 15.

By moving table 106 in the A direction, tool 113 and gear tooth groove 115 gradually approach radially of gear 14 such that tapered portion 114 is inserted into tooth groove 115. By moving spindle 112 in the E direction, tool 113 and gear 14 gradually approach in the direction in which tapered portion 114 is inserted into tooth groove 115 along the axis G of tool 113.

If side surfaces 18A and end surfaces 18B of internal teeth 18 on both sides of tooth groove 115 are chamfered by tapered portion 114 in the above (A+E) synthetic movement, a chamfering line shown by H in FIG. 18 is formed on end surface 18B.

Figure 23:
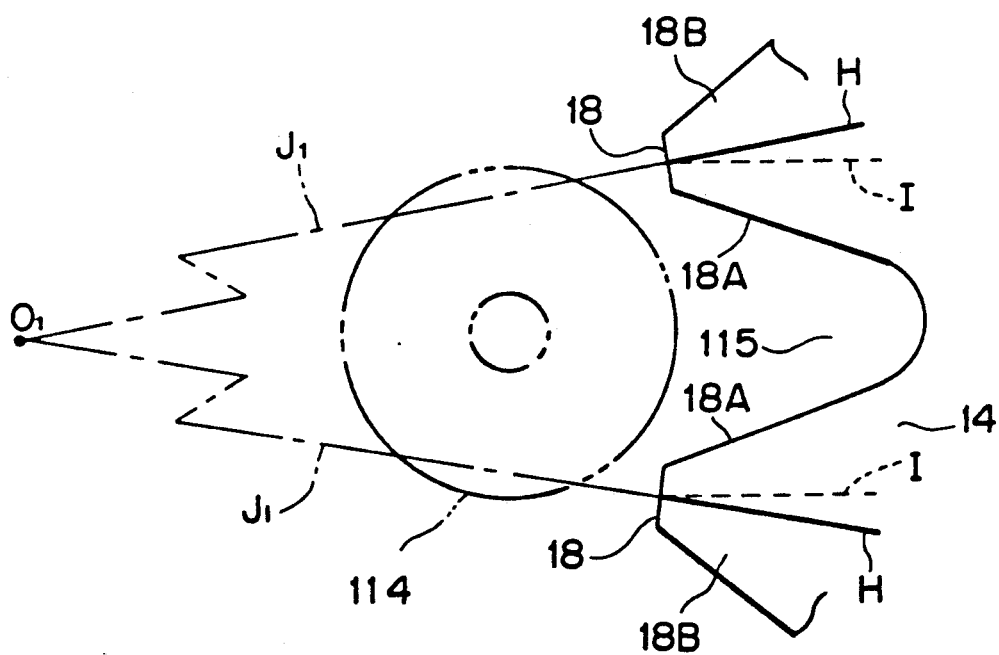
Figure 24:
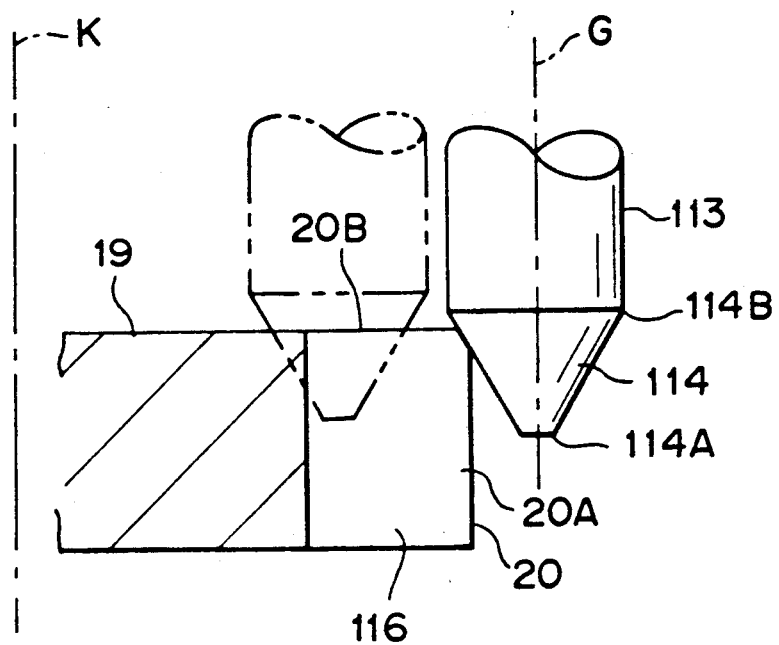
Figure 25:
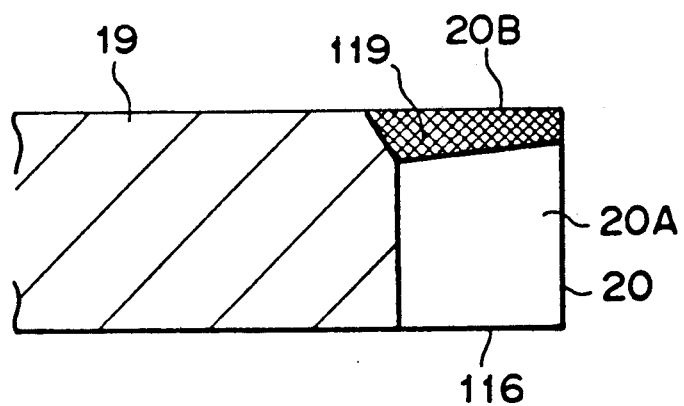
Figure 26:
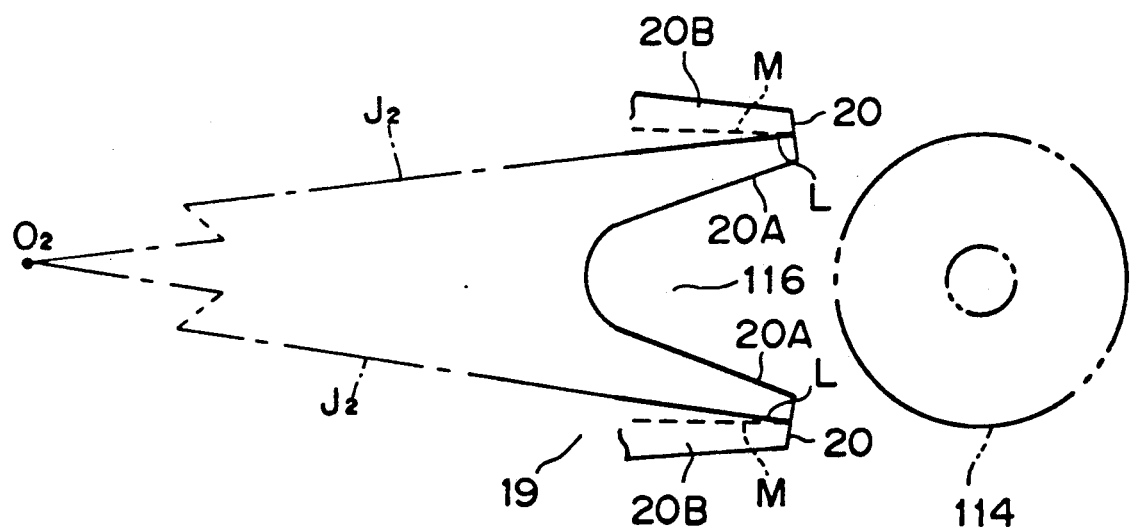

The character I in FIG. 23 shows a chamfering line formed by chamfering without moving spindle 112 in the E direction. In this case, end surface 18B of internal teeth 18 is chamfered at the same position at a fixed height from the minimum taper diameter end 114A, so that two chamfering lines I result. In contrast, if spindle 112 is moved in the E direction, end surface 18B of internal teeth 18 is machined at a higher position from the minimum taper diameter end 114A as table 106 moves in the A direction. When tapered portion 114 arrives at the tooth bottom of gear 14 and the chamfering ends, end surface 18B is chamfered in the vicinity of the maximum taper diameter end 114B, so that chamfering line H is opened outwardly of I.

It will be seen from the above that if the shape of the taper involving the tapering angle and the ratio in the A-direction speed to the E-direction speed are set appropriately in accordance with the pitch of internal teeth 18, etc., chamfering line H can be made coincident with center line J1 passing through the center 01 of gear 14 and pass through the center in the end of internal tooth 18, as shown in FIG. 18.

After the above working, table 106 of machine tool 105 is moved in the B direction and spindle 112 is moved in the F direction to remove tapered portion 114 from tooth groove 115. Thereafter, work receiving plate 109 is turned around axis C by a quantity for the pitch of internal teeth 18 such that tapered portion 114 faces the next tooth groove 115 radially of gear 14 and then the above operation is repeated.

If the respective internal teeth 18 are chamfered as mentioned above, a chamfered surface 117 is formed on side surface 18A and end surface 18B of the respective internal teeth 18 as shown in FIG. 17. Angle edge line 118 as shown in FIGS. 10 and 11 is formed on end surface 18B by chamfering line H such that angle edge line 118 coincides with center passing line J1.

Figure 21:
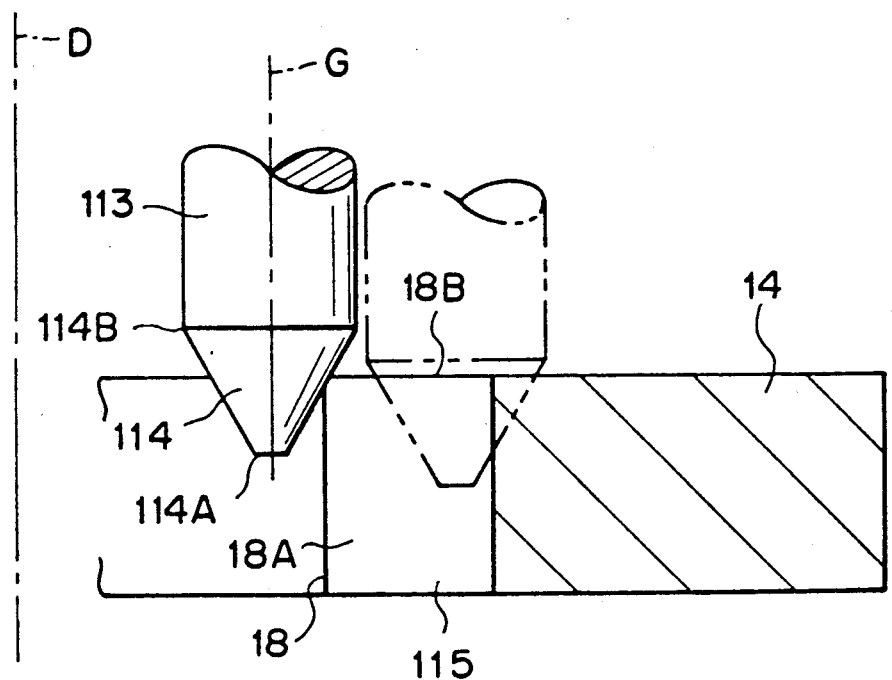
Figure 22:
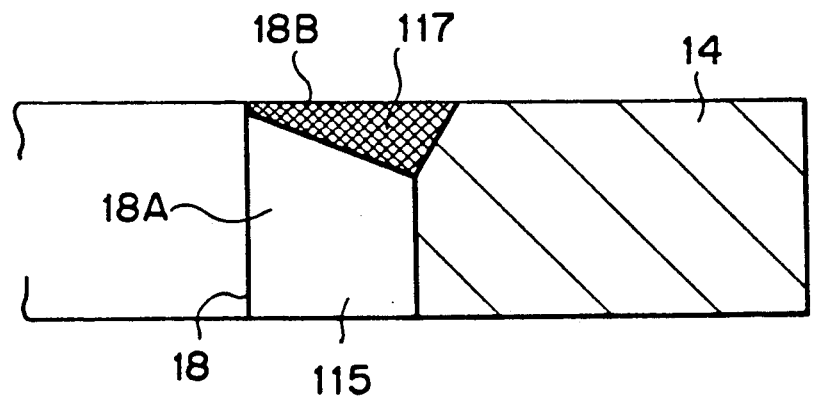

FIGS. 19-21 illustrate chamfering external teeth 20 of coupling member 19 which is a coupling gear. Also, in this case, the axis G of tool 113 and the axis K of gear 19 are parallel, as shown in FIG. 19.

The tapered portion 114 side of tool 113 and tooth groove 116 of gear 19 face radially of gear 19 at an end of external tooth 20 perpendicular to its axis. Under such condition, tool 113 is rotated to move table 106 of machine tool 105 horizontally in the B direction while moving spindle 112 in the F direction.

By moving table 106 in the B direction, tool 113 and tooth groove 116 of gear 19 gradually approach radially of gear 19 such that tapered portion 114 is inserted into tooth groove 116. By moving spindle 112 in the F direction, tool 113 and gear 19 are gradually moved away from each other in the direction in which tapered portion 114 is moved out of tooth groove 116 along axis G of tool 113.

By chamfering sides 20A and end surfaces 20B of external teeth 20 on both sides of tooth groove 116 with tapered portion 114, chamfering lines L shown in FIG. 21 are formed on end surfaces 20B. The character M of FIG. 21 shows chamfering lines formed by chamfering without moving spindle 112 in the F direction, in which case end surfaces 20B are machined at the same height from the minimum taper diameter end 114A, so that two parallel chamfering lines M result.

In contrast, since spindle 112 is moved in the F direction in the present embodiment, chamfering line L is closed inside M, and the line L can be made coincident with center passing line J2 passing through center 02 of gear 19.

By chamfering respective external teeth 20, chamfering lines 119 of FIG. 20 are formed on side surfaces 20A and end surfaces 20B of external teeth 20, and angle edge lines 119 due to chamfering lines L are formed on end surfaces 20B as shown in FIGS. 15 and 16 such that angle edge line 119 coincides with center passing line J2.

As described above, according to the present embodiment, chamfering can be made with axis G of tool 113 parallel to the axes D, K of gears 14, 19, so that both of internal and external teeth 18, 20 can be chamfered. Since internal and external teeth 18, 20 can be chamfered by only reversing the directions of movement of table 106 and spindle 112, they can be chamfered using the same machine tool.

While in the above embodiment the process for chamfering the teeth of the coupling gear constituting coupling 21 of FIG. 1 has been described, the coupling gear constituting part of coupling 61 of FIG. 5 can also be chamfered as in the above embodiment. While the external and internal teeth are shown being provided on the separate corresponding gears, the present invention is also applicable when external and internal teeth are provided on the outer and inner peripheries, respectively, of the same gear.

While in the above embodiment angle edge lines 118, 120 are shown as taking the form of an edge, these angle edge lines each may have a flat portion with a small width at an end thereof. The machine tool to carry out the present invention is not restricted to those shown in FIGS. 6 and 15; other machine tools may be used for chamfering purposes. Alternatively, a special-purpose machine tool may be manufactured for chamfering all the teeth simultaneously. The rotating tool may be disposed so as to have a horizontal axis to which the axis of a gear may be tilted. A gear may have a vertical or horizontal axis to which the axis of the rotating tool may be tilted. In order to insert the taper of the rotating tool into the tooth groove of the gear, the gear may be moved without changing the position of the rotating tool as in the above embodiment. Alternatively, the rotating tool may be used without moving the gear or both of the tool and gear may be moved.

According to the present invention, a vertical stroke of the slide may be adjusted easily in a short time and this operation can be automated.

The coupling which is connected and disconnected by the axial movement of the crank shaft is provided between an end of the main gear and an end of the crank shaft extruding beyond one of the two bearings which support the crank shaft, so that adjustment of engagement of the coupling is easily performed.

Since the respective main gears provided on the two corresponding parallel crank shafts mesh with each other, the drive force from the single drive source is transmitted from one of the main gears to the other. Thus the respective slide strokes of the connecting rods can be changed simultaneously by the same quantity.

What is claimed is:

1. An apparatus for adjusting the stroke of a slide of a press machine, comprising:
    at least one crank shaft attached to a housing and having a circular eccentric portion;
    an eccentric sleeve fitted over said circular eccentric portion in eccentric relationship thereto;
    a connecting rod having an upper end fitted over said eccentric sleeve and having a lower end connected to said slide, wherein rotation of said eccentric sleeve relative to said circular eccentric portion changes an angular phase between said circular eccentric portion and said eccentric sleeve to adjust a vertical stroke of said slide in response to rotation of said crank shaft;
    a main motor;
    a speed decreasing motor;
    at least one drive shaft;
    said main motor and said speed decreasing motor driving said at least one drive shaft;
    first teeth provided on said eccentric sleeve in concentric relationship to said circular eccentric portion;
    at least one main gear disposed coaxially with and on said at least one crank shaft and driven by said at least one drive shaft;
    second teeth provided on said main gear coaxially with said crank shaft and meshing with said first teeth;
    means for moving said crank shaft axially;
    a coupling provided between said crank shaft and said main gear for disconnecting and connecting said at least one crank shaft and said main gear in response to an axial movement of said crank shaft; and
    means for preventing said crank shaft which has moved axially from rotating.

2. The apparatus according to claim 1, wherein said coupling includes:
    a first coupling gear with internal teeth or external teeth provided on said crank shaft;
    a second coupling gear with external teeth or internal teeth provided on said main gear;
    said first coupling gear having respectively internal teeth when said second coupling gear has external teeth and external teeth when said second coupling gear has internal teeth; and
    said first and said second coupling gears are movable axially relative to each other for engaging or disengaging purposes.

3. The apparatus according to claim 1, wherein:
    said crank shaft is supported rotatably and axially movable by at least two bearings disposed one on each side of said circular eccentric portion; and
    said coupling gears are mounted on said crank shaft and on respective ends of said main gear to extend beyond one of said at least two bearings.

4. The apparatus according to claim 1, wherein:
    said at least one drive shaft is one in number;
    said at least one crank shafts are parallel and two in number;
    each of said at least one main gears is disposed on the corresponding crank shaft;
    each of said at least one main gear is engaged with the other, and one of said at least one main gears, being driven by said drive shaft, transmits a torque to the other of said at least one main gears.

5. The apparatus according to claim 1, wherein crank shaft rotation preventing means includes an engaging block fixed to an end of the crank shaft and having an engaging hole and an engaging pin fixed to the housing and being engageable in the hole.

6. The apparatus according to claim 1, wherein the crank shaft moving means includes a hydraulic actuator attached to the bearings on the crank shaft and having a piston rod therein, and a hydraulic circuit, wherein the piston rod of the hydraulic actuator is connected rotatably to the crank shaft and movable axially of the crank shaft, and wherein the hydraulic circuit causes the hydraulic actuator to move axially of the crank shaft.

7. The apparatus according to claim 6, wherein the hydraulic circuit includes a hydraulic oil source for feeding a hydraulic oil to the hydraulic actuator, a hydraulic oil tank for discharging the hydraulic oil in the hydraulic actuator, a change-over valve for changing the direction of the hydraulic oil fed to the hydraulic actuator so as to the crank shaft forward or backward.

8. The apparatus according to claim 1, wherein the first teeth include external teeth and the second teeth include internal teeth.

9. The apparatus according to claim 1, wherein the first teeth include internal teeth and the second teeth include external teeth.

10. The apparatus according to claim 1, wherein said speed decreasing motor is disposed to move said slide vertically when a mold is to be replaced in said press machine.

11. The apparatus according to claim 2, wherein an axial end of a tooth of one of said first and said second coupling gears has a chamfered portion.

12. The apparatus according to claim 2, wherein at least one of said internal teeth of at least one of said first and said second coupling gears has at an axial end a chamfered portion.

13. The apparatus according to claim 2, wherein at least one of said external teeth of at least one of said first and said second coupling gears has at an axial end a chamfered portion.

* * * * *